United States Patent
Li et al.

(10) Patent No.: US 8,248,996 B2
(45) Date of Patent: Aug. 21, 2012

(54) METHODS AND APPARATUS FOR USING A LICENSED SPECTRUM TO TRANSMIT A SIGNAL WHEN AN UNLICENSED SPECTRUM IS CONGESTED

(75) Inventors: Junyi Li, Chester, NJ (US); Saurabh Tavildar, Jersey City, NJ (US); Aleksandar Jovicic, Piscataway, NJ (US); Thomas Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 502 days.

(21) Appl. No.: 12/510,353

(22) Filed: Jul. 28, 2009

(65) Prior Publication Data
US 2011/0028102 A1    Feb. 3, 2011

(51) Int. Cl.
*H04W 4/00* (2009.01)
(52) U.S. Cl. ......................................... 370/328; 370/329
(58) Field of Classification Search .................. None
See application file for complete search history.

(56) References Cited

U.S. PATENT DOCUMENTS

| | | | |
|---|---|---|---|
| 7,512,094 B1 * | 3/2009 | Linebarger et al. | 370/329 |
| 8,078,111 B2 * | 12/2011 | Jovicic et al. | 455/63.1 |
| 2006/0281404 A1 * | 12/2006 | Lee et al. | 455/11.1 |
| 2007/0097906 A1 * | 5/2007 | Kato | 370/328 |
| 2008/0130519 A1 | 6/2008 | Bahl et al. | |
| 2011/0019541 A1 * | 1/2011 | Li et al. | 370/230 |
| 2011/0028102 A1 * | 2/2011 | Li et al. | 455/71 |
| 2011/0287794 A1 * | 11/2011 | Koskela et al. | 455/509 |
| 2011/0299511 A1 * | 12/2011 | Cook | 370/338 |

FOREIGN PATENT DOCUMENTS

| | | |
|---|---|---|
| EP | 1750466 A1 | 2/2007 |
| WO | WO2007082244 | 7/2007 |

OTHER PUBLICATIONS

International Search Report and Written Opinion—PCT/US2010/043173—International Search Authority, European Patent Office, Nov. 5, 2010.

* cited by examiner

*Primary Examiner* — Robert Wilson
(74) *Attorney, Agent, or Firm* — James O'Hare; Paul S. Holdaway

(57) ABSTRACT

Methods and apparatus of using a licensed spectrum to transmit a signal when an unlicensed spectrum is congested are disclosed. One method includes receiving, at a first mobile device, a request signal from a second mobile device, receiving, at the first mobile device, a remote signal from one or more mobile devices using the unlicensed spectrum, and transmitting a control signal from the first mobile device to the second mobile device using the licensed spectrum, the control signal being based on the remote signal. The control signal carries control information that is based on at least one of a time at which the second mobile device sends a signal to the first mobile device or the received powers of the remote signal and the request signal.

28 Claims, 4 Drawing Sheets

METHODS AND APPARATUS FOR USING A LICENSED SPECTRUM TO TRANSMIT A SIGNAL WHEN AN UNLICENSED SPECTRUM IS CONGESTED

RELATED APPLICATIONS

This application is related to U.S. patent application Ser. No. 12/507,578 filed Jul. 22, 2009 and published as U.S. Patent Publication number 2011/0019541.

BACKGROUND

1. Field

The invention relates to wireless communications. More particularly, the invention relates to methods and apparatus for using a licensed spectrum to transmit a signal when an unlicensed spectrum is congested.

2. Background

Wireless communications continues to grow in demand and has become an integral part of both personal and business communications. Wireless communications allow users to transmit and receive data from most anywhere using wireless networks and wireless devices such as laptops, cellular devices, iPhones, BlackBerrys, etc.

Wireless devices are generally configured to operate in either a licensed frequency spectrum or an unlicensed frequency spectrum. Different countries have set aside different portions of the frequency spectrum as the licensed frequency spectrum and the unlicensed frequency spectrum for operation of wireless devices. As an example, in the United States, the 1.9 GHz spectrum has been used as a licensed spectrum for broadband wireless devices. Outside the United States, the 3.5 GHz spectrum has been the most widely used licensed spectrum for broadband wireless devices. The licensed spectrum includes all frequency bands that require a license to operate a wireless device. In the licensed spectrum, only the spectrum licensee can build infrastructure, and allow communications and offer services across its spectrum range. The licensed spectrum is more reliable and has less traffic congestion but generally has a narrower bandwidth when compared to the unlicensed spectrum. Hence, large amounts of data may take longer to transmit using the licensed spectrum.

The unlicensed spectrum includes all frequency bands that do not require a license to operate a wireless device. In the unlicensed spectrum, any user is free to use the frequency band for short range wireless communications. The unlicensed spectrum is inexpensive and has a larger band when compared to the licensed spectrum but is not controlled by any third party so can be unreliable and congested due to large amounts of data passing across these frequency bands. However, when the unlicensed spectrum is not congested, it can be useful for transferring large amount of data.

In the United States, the unlicensed spectrums are at 2.4 GHz and at 5.2 GHz, of which are both free to use. The Federal Communications Commission (FCC) currently sets requirements for the unlicensed spectrums such as limits on transmit power spectral density and limits on antenna gain.

Therefore, it has been recognized by those skilled in the art that a need exists for methods and apparatus for using a licensed spectrum to transmit a signal when an unlicensed spectrum is congested.

SUMMARY

Methods and apparatus of using a licensed spectrum to transmit a signal when an unlicensed spectrum is congested are disclosed. One method includes receiving, at a first mobile device, a request signal from a second mobile device, receiving, at the first mobile device, a remote signal from one or more mobile devices using the unlicensed spectrum, and transmitting a control signal from the first mobile device to the second mobile device using the licensed spectrum, the control signal being based on the remote signal. The control signal carries control information that is based on at least one of a time at which the second mobile device sends a signal to the first mobile device or the received powers of the remote signal and the request signal. The method also includes transmitting a signal from the second mobile device to the first mobile device using the unlicensed spectrum at a code rate or a time derived from the control information.

An apparatus for using a licensed spectrum to transmit a signal when an unlicensed spectrum is congested is disclosed. The apparatus includes a processor configured to receive a request signal from a mobile device, receive a remote signal from one or more mobile devices using the unlicensed spectrum, and transmit a control signal to the mobile device using the licensed spectrum, the control signal being based on the remote signal. The control signal carries control information that is based on at least one of a time at which the mobile device sends a signal to another mobile device or the received powers of the remote signal and the request signal.

BRIEF DESCRIPTION OF THE DRAWINGS

The features, objects, and advantages of the invention will become more apparent from the detailed description set forth below when taken in conjunction with the drawings, wherein.

DETAILED DESCRIPTION

Methods and systems that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1:
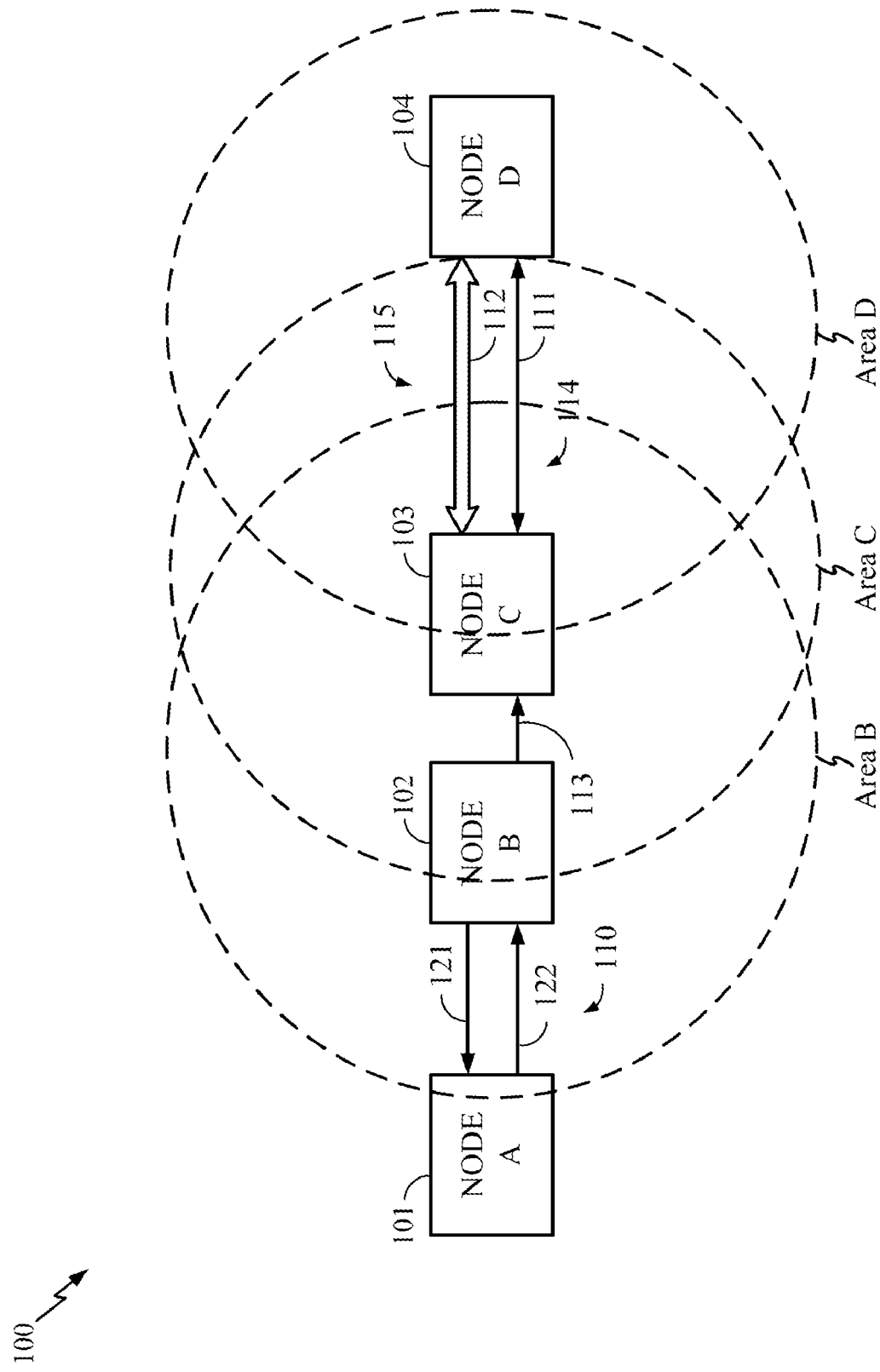
FIG. 1 is a simplified block diagram of a network having a plurality of nodes configured to operate in the licensed spectrum and the unlicensed spectrum in accordance with various embodiments.

FIG. 1 is a simplified block diagram of a network 100 having a plurality of nodes 101, 102, 103 and 104 configured to operate in the licensed spectrum and the unlicensed spectrum in accordance with various embodiments. In various embodiments, the network 100 can include one or more networks such as a WiFi network, an unlicensed network (i.e., a network operating in the unlicensed spectrum), a licensed network (i.e., a network operating in the licensed spectrum) and/or a carrier sense multiple access with collision avoidance (CSMA/CA) network, and each of the plurality of nodes 101, 102, 103 and 104 can be a WiFi device or node, a mobile device or a wireless communications device configured to operate in the licensed spectrum and the unlicensed spectrum, a user, or a white-space device (WSD) configured to operate in the licensed spectrum and the unlicensed spectrum. A WSD can be a mobile device, a laptop computer or other portable device operating in open or unused frequencies. For illustrative purposes, the disclosure will discuss WiFi networks; however, other types of licensed and unlicensed networks are within the scope of the invention. Furthermore, even though four nodes 101, 102, 103 and 104 are shown in FIG. 1, the network 100 can include one or more nodes. For illustrative purposes, nodes 101, 102, 103 and 104 will also be referred to as node A, node B, node C and node D, respectively.

Figure 2:
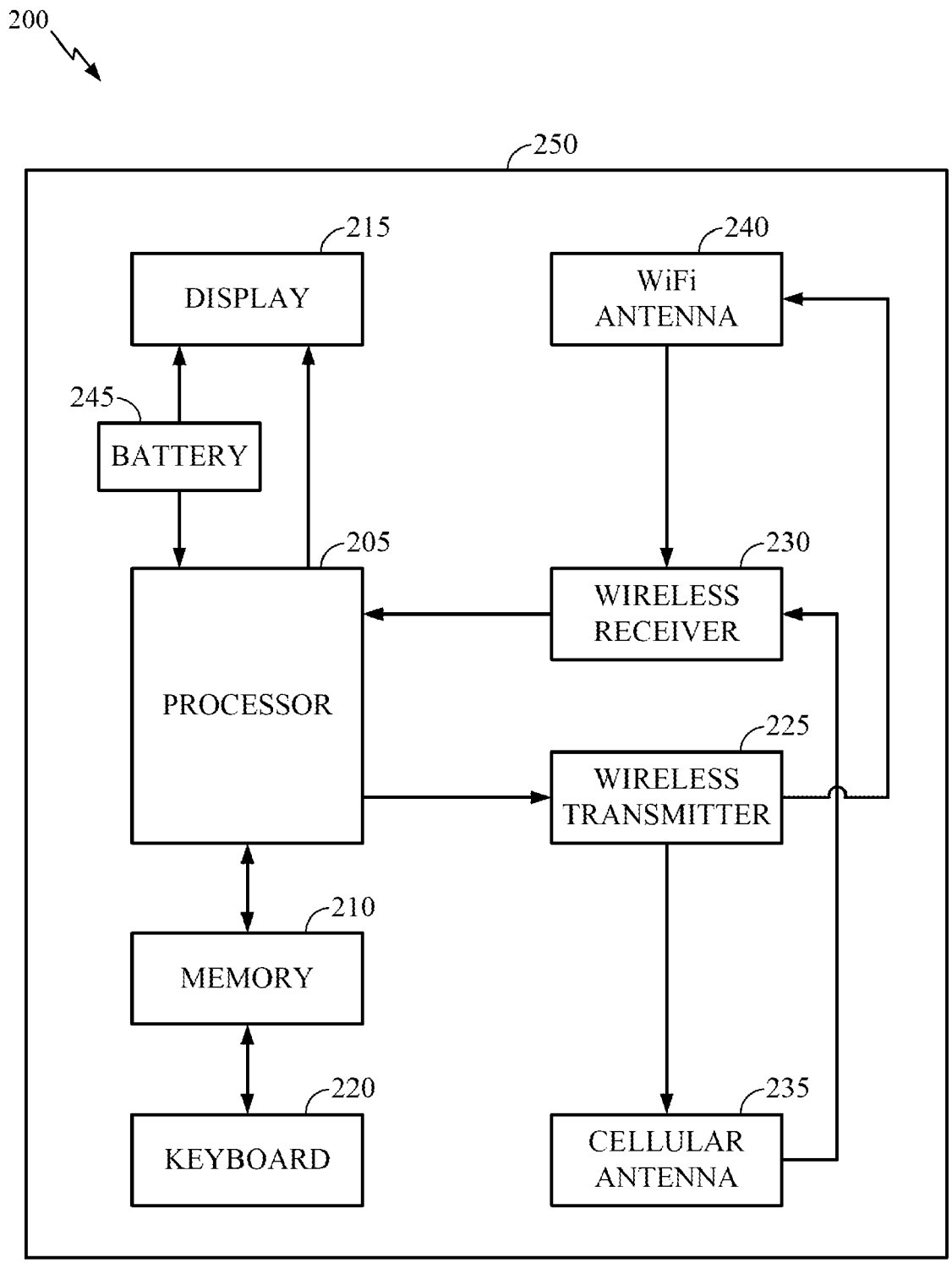
FIG. 2 is a block diagram of an exemplary node configured to operate in the licensed spectrum and the unlicensed spectrum in accordance with various embodiments.

FIG. 2 is a block diagram of an exemplary node configured to operate in the licensed spectrum and the unlicensed spectrum in accordance with various embodiments. For illustrative purposes, the term "node" will refer to a wireless communications device 200. The wireless communications device 200 is configured to communicate in the licensed spectrum and the unlicensed spectrum. The wireless communications device 200 includes a processor 205, a memory 210, a display 215, a keyboard 220, a wireless transmitter 225, a wireless receiver 230, a first antenna 235, a second antenna 240, and a battery 245. The chips, components or modules may be attached or formed on a printed circuit board 250. The printed circuit board 250 can refer to any dielectric substrate, ceramic substrate, or other circuit carrying structure for carrying signal circuits and electronic components within the wireless communications device 200.

The processor 205 may be implemented using hardware, software, firmware, middleware, microcode, or any combination thereof. The processor 225 may be an Advanced RISC Machine (ARM), a controller, a digital signal processor (DSP), a microprocessor, an encoder, a decoder, circuitry, a processor chip, or any other device capable of processing data, and combinations thereof. The term "circuitry" may include processor circuitry, memory circuitry, RF transceiver circuitry, power circuitry, video circuitry, audio circuitry, keyboard circuitry, and display circuitry.

The memory 210 may include or store various routines and data. The term "memory" and "machine readable medium" include, but are not limited to, random access memory (RAM), flash memory, read-only memory (ROM), EPROM, EEPROM, registers, hard disk, removable disk, CD-ROM, DVD, wireless channels, and various other mediums capable of storing, containing or carrying instruction(s) and/or data. The machine readable instructions may be stored in the memory 210 and may be executed by the processor 205 to cause the processor 205 to perform various functions as described in this disclosure. The display 215 may be a LCD, LED or plasma display screen and the keyboard 220 may be a standard keyboard (e.g., a QWERTY layout) having letters and numbers.

The wireless transmitter 225 is coupled to the processor 205 and is used to encode and format the data for transmission via the first antenna 235 and/or the second antenna 240. The wireless receiver 230 is coupled to the processor 205 and is used to decode and parse the data after being received from the first antenna 235 and/or the second antenna 240. The first antenna 235 may be positioned at a lower right portion of the wireless communications device 200 and the second antenna 240 may be positioned at an upper right portion of the wireless communications device 200. The first antenna 235 may be a cellular antenna, a GSM antenna, a CDMA antenna, a WCDMA antenna, or any other antenna capable of operating using the licensed spectrum. The second antenna 240 may be a WiFi antenna, a GPS antenna, or any other antenna capable of operating using the unlicensed spectrum. The battery 245 supplies power to the components or modules shown in FIG. 2.

Figure 3:
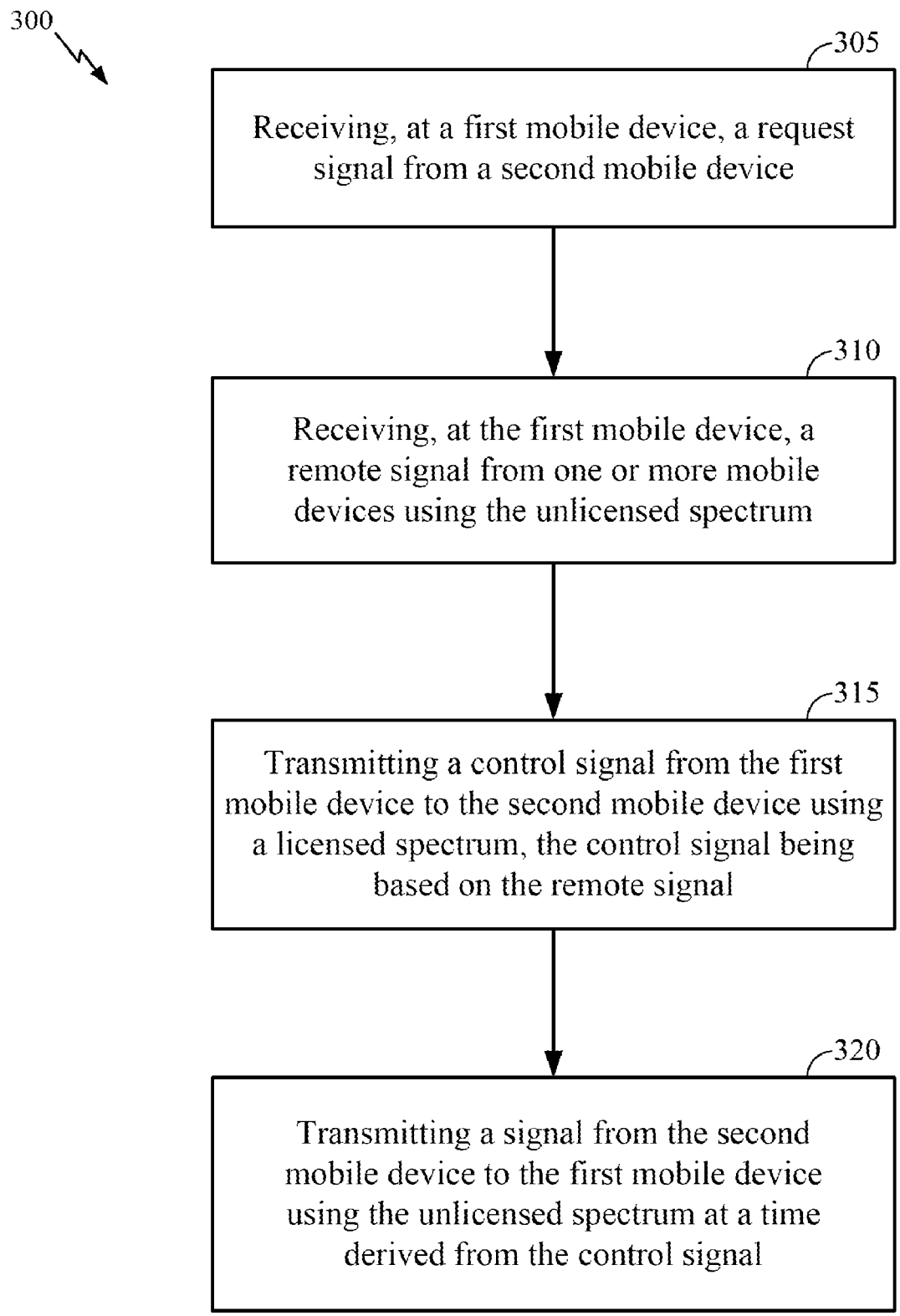
FIG. 3 is a flow diagram illustrating a method of using the licensed spectrum to transmit a signal when the unlicensed spectrum is congested or experiencing heavy data communications or interference in accordance with various embodiments.

FIG. 3 is a flow diagram illustrating a method 300 of using the licensed spectrum to transmit a signal when the unlicensed spectrum is congested or experiencing heavy data communications or interference in accordance with various embodiments. The method 300 provides interference management in an in-band wireless resource using an out of band wireless resource. The in-band wireless resource may be a primary channel such as the unlicensed spectrum and the out of band wireless resource may be a secondary channel such as the licensed spectrum. The out of band wireless resource allows for the exchange of information in order to enhance the performance of the in-band wireless resource (e.g., the medium access control channel of the WiFi channel). The out of band wireless resource is generally a reliable, low latency, synchronous channel with relatively low-to-medium data transfer rates. An example of wireless communications in the licensed spectrum and the unlicensed spectrum may help illustrate some of the advantages of the invention (e.g., increasing power efficiency and decreasing latency of the wireless communications device 200).

Referring to FIGS. 1-3, nodes C and D can increase power efficiency and decrease latency by utilizing an out of band wireless resource 115 which avoids the inherent delays of WiFi communications. The out of band wireless resource 115 may be a secondary channel such as the licensed spectrum. The out of band wireless resource 115 allows nodes C and D to establish wireless communications using the out of band wireless resource 115 when an in band wireless resource 114 (e.g., a primary channel such as the unlicensed spectrum) is being utilized for wireless (e.g., WiFi) communications by other nodes, for example, nodes A and B. For illustrative purposes, the out of band wireless resource 115 is denoted by the thicker arrow, the in band wireless resource 114 is denoted by the thinner arrow, and each node A, B, C and D is a wireless communications device 200 as shown in FIG. 2.

Node D (e.g., a second wireless communications device) retrieves a request signal 111 from its memory 210 and transmits, using the wireless transmitter 225 and the second antenna 240, the request signal 111 to area D or node C (e.g., a first wireless communications device) using the unlicensed spectrum 114. The request signal 111 can be a control signal, a request to send (RTS) signal or a data signal. Node C receives the request signal 111 from node D using the unlicensed spectrum 114 (block 305). In one embodiment, node C receives the request signal 111 via the second antenna 240 and the wireless receiver 230 and decodes the request signal 111 using the processor 205.

Nodes A and B may be communicating using the unlicensed spectrum 110. For example, node B may transmit a request signal 121 (e.g., a RTS signal) to node A and node A may respond by transmitting a response signal 122 (e.g., a CTS signal) to node B. Node B broadcasts control information (e.g., a code rate or a packet length or time) about the duration of its transmission to node A in the network allocation vector (NAV) or some other part of its request signal 121. Since node C is in close proximity to node B, node C receives and decodes a remote signal 113 that includes a network allocation vector (NAV) from one or more wireless communications devices (e.g., node A or node B) using the unlicensed spectrum 114 (block 310). The remote signal 113 can be a control signal, a RTS signal, a CTS signal or a data signal. The processor 205 of node C may be used to decode the remote signal 113 received from the one or more wireless communications devices (e.g., node A or node B). The decoded network allocation vector may be stored in the memory 210 of node C. Hence, node C receives (and decodes) a request signal 111 from node D and receives (and decodes) a remote signal 113 from node B.

After node C receives the request signal 111 from node D, node C wants to communicate with node D using the unlicensed spectrum 114, however, is unable to do so due to the congestion in area C (i.e., other nodes transmitting such as node B's communication with node A in area B) in the unlicensed spectrum 114. Node C can hear the communication from node B to node A, but node D cannot hear this communication. Since node C cannot transmit to node D using the unlicensed spectrum 114, node C uses the licensed spectrum 115 to transmit a response signal 112 to node D. In one embodiment, node C may transmit the response signal 112 via its wireless transmitter 225 and its first antenna 235. The response signal 112 can be a control signal, a CTS signal or a data signal. The response signal 112 (or the control signal 112) carries control information that is based on at least one of a time at which node D sends a signal to node C or the received power of the remote signal 113 and the request signal 111. Node C's use of the licensed spectrum 115 to respond to node D improves efficiency and decreases latency because node D does not have to continue to resend request signals 111 to node C due to congestion of the unlicensed spectrum 114 or node C's unresponsiveness. Each resend of a request signal 111 causes a delay that may be increasingly greater, for example, between the first request signal and the second request signal (1 period delay) as compared to between the second request signal and the third request signal (2 period delay), and so on. These delays cause latencies in communications between nodes C and D as well as other nodes in the network.

Node C is aware of a start time of the packet from node B to node A because node C received the request signal 121 (or the remote signal 113) that was being sent from node B to node A. The request signal 121 may include control information such as the code rate or the start time and the packet length or time or remaining packet length or time for the packet or communication currently taking place between nodes A and B. The start time and the packet length or time or remaining packet length or time informs node D using the licensed spectrum 115 when to begin transmitting data to node C using the unlicensed spectrum 114. Node C transmits to node D, using the licensed spectrum 115, the response signal 112 (or a control signal) including the control information (block 315). In one embodiment, the response signal 112 is based on the remote signal 113. Node D uses the control information to determine when to use the unlicensed spectrum 114 to transmit to node C. That is, after the packet length or time has expired, node D can resend the request signal 111 to node C using the unlicensed spectrum 114. Node D uses the control information (e.g., the start time and the packet length or time or remaining packet length or time) to accurately determine when to send a request signal 111 to node C using the unlicensed spectrum 114 (block 320) (i.e., when the unlicensed spectrum 114 may become available again); thus saving unnecessary backoffs of other wireless communications devices and avoiding increasing its own congestion window. Thereafter, nodes C and D may transmit data using the unlicensed spectrum 114.

In some instances, node C, using its processor 205, cannot properly receive or decode the request signal 111 from node D using the unlicensed spectrum 114. This may be due to the congestion in area C (i.e., other nodes transmitting such as node B's communication with node A in area B) in the unlicensed spectrum 114.

Node D may sense this congestion on the unlicensed spectrum 114 or may not receive a response signal 111 from node C on the unlicensed spectrum 114 and thereafter may resend the request signal 112 using the licensed spectrum 115. Node C also uses the licensed spectrum 115 to transmit a response signal 112 to node D (block 320). The response signal 112 may include the control information, which may be based on or derived from the network allocation vector or the interference information described herein. Thereafter, nodes C and D can transmit as described above.

In another embodiment, nodes A and B may use a carrier-sense multiple access (CSMA) protocol instead of RTS/CTS signals. In this case, node B may not transmit a request signal 121 (or a remote signal 113) so node C will not be able to detect the duration of the packet transmission from node B to node A. Similarly, node D may not send a request signal 111 but may begin transmitting a data signal 111 using the unlicensed spectrum 114 as soon as its CSMA algorithm (stored in its memory 210) determines that there are no communications or transmissions going on in its area D or neighborhood. If node C can decode the data signal 111 from node D, node C may send an acknowledgement (ACK) signal 112 to node D via the licensed spectrum 115. If node C cannot decode the data signal 111 from node D but it can detect that node D is sending data, node C can send a response signal 112 using the licensed spectrum 115 to node D, the response signal 112 carrying interference information including (1) the received signal strength of the data signal 111 (or the request signal 111) and (2) the energy level of the interference (e.g., signal-to-noise ratio) that node C is experiencing due to the ongoing transmission from one or more nodes (e.g., node B to node A) (blocks 315 and 320). Node D can then use this interference information to modify its code rate and resend the data signal 111 so that node C may decode the data.

Figure 4:
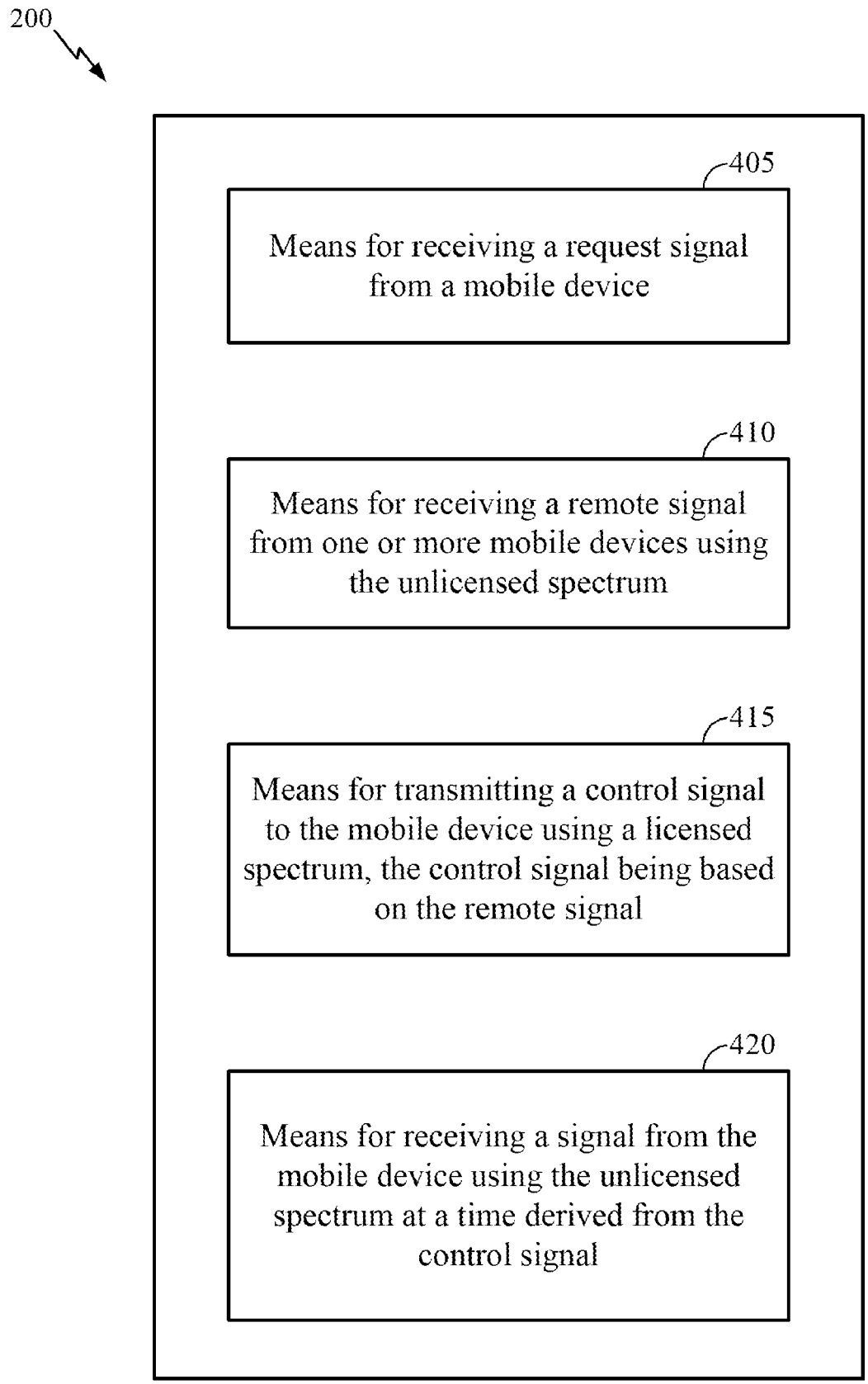
FIG. 4 is a block diagram illustrating exemplary components for the apparatus and the means for apparatus for using a licensed spectrum to transmit a signal when an unlicensed spectrum is congested or experiencing heavy data communications or interference in accordance with various embodiments.

FIG. 4 is a block diagram illustrating exemplary components for the apparatus and the means for apparatus for using a licensed spectrum to transmit a signal when an unlicensed spectrum is congested or experiencing heavy data communications or interference in accordance with various embodiments. The apparatus 103 may include a module 405 for receiving a request signal 111 from a second mobile device 104 using an unlicensed spectrum 114 or a licensed spectrum 115, a module 410 for receiving a remote signal 113 from one or more mobile devices 101 or 102 using the unlicensed spectrum 114, a module 415 for transmitting a control signal 112 from the first mobile device 103 to the second mobile device 104 using the licensed spectrum 115, and a module 420 for transmitting a signal 111 from the second mobile device 104 to the first mobile device 103 using the unlicensed spectrum 114 at a time derived from the control signal. The signal 111 may be based on or derived from the control signal 112.

Those skilled in the art will appreciate that the various illustrative logical blocks, modules, circuits, and algorithms described in connection with the embodiments disclosed herein may be implemented as electronic hardware, computer software, or combinations of both. To illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processing device, a digital signal processing device (DSP), an application specific integrated circuit (ASIC), a field programmable gate array (FPGA) or other programmable logic device, discrete gate or transistor logic, discrete hardware components, or any combination thereof designed to perform the functions described herein. A general purpose processing device may be a microprocessing device, but in the alternative, the processing device may be any conventional processing device, processing device, microprocessing device, or state machine. A processing device may also be implemented as a combination of computing devices, e.g., a combination of a DSP and a microprocessing device, a plurality of microprocessing devices, one or more microprocessing devices in conjunction with a DSP core or any other such configuration.

The apparatus, methods or algorithms described in connection with the embodiments disclosed herein may be embodied directly in hardware, software, or combination thereof. In software the methods or algorithms may be embodied in one or more instructions that may be executed by a processing device. The instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processing device such the processing device can read information from, and write information to, the storage medium. In the alternative, the storage medium may be integral to the processing device. The processing device and the storage medium may reside in an ASIC. The ASIC may reside in a user terminal. In the alternative, the processing device and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of using a licensed spectrum to transmit a signal when an unlicensed spectrum is congested, the method comprising:
    receiving, at a first mobile device and via the unlicensed spectrum, a request signal from a second mobile device;
    receiving, at the first mobile device, a remote signal from one or more mobile devices using the unlicensed spectrum; and
    transmitting a response signal from the first mobile device to the second mobile device using a licensed spectrum, the response signal being based on the remote signal.

2. The method of claim 1 wherein the response signal carries control information that is based on a received power of the remote signal and a received power of the request signal.

3. The method of claim 1 further comprising transmitting a subsequent signal from the second mobile device to the first mobile device using the unlicensed spectrum at a time derived from control information of the response signal.

4. The method of claim 3 wherein the subsequent signal is selected from a group consisting of a control signal, a request to send (RTS) signal, and a data signal.

5. The method of claim 1 further comprising transmitting a subsequent signal from the second mobile device to the first mobile device at a code rate derived from control information of the response signal.

6. The method of claim 5 wherein the subsequent signal is selected from a group consisting of a control signal, a request to send (RTS) signal, and a data signal.

7. The method of claim 1 wherein the request signal is selected from a group consisting of a control signal, a request to send (RTS) signal, and a data signal.

8. An apparatus for using a licensed spectrum to transmit a signal when an unlicensed spectrum is congested, the apparatus comprising:
    a processor configured to:
    receive a request signal from a mobile device via the unlicensed spectrum;
    receive a remote signal from one or more mobile devices using the unlicensed spectrum; and
    transmit a response signal to the mobile device using a licensed spectrum, the response signal being based on the remote signal.

9. The apparatus of claim 8 wherein the response signal carries control information that is based on a received power of the remote signal and a received power of the request signal.

10. The apparatus of claim 8 wherein the processor is further configured to transmit a subsequent signal from the mobile device to another mobile device using the unlicensed spectrum at a time derived from control information of the response signal.

11. The apparatus of claim 10 wherein the subsequent signal is selected from a group consisting of a control signal, a request to send (RTS) signal, and a data signal.

12. The apparatus of claim 8 wherein the processor is further configured to transmit a subsequent signal from the mobile device to another mobile device at a code rate derived from control information of the response signal.

13. The apparatus of claim 12 wherein the subsequent signal is selected from a group consisting of a control signal, a request to send (RTS) signal, and a data signal.

14. The apparatus of claim 8 wherein the request signal is selected from a group consisting of a control signal, a request to send (RTS) signal, and a data signal.

15. An apparatus for using a licensed spectrum to transmit a signal when an unlicensed spectrum is congested, the apparatus comprising:
    means for receiving a request signal from a mobile device via the unlicensed spectrum;
    means for receiving a remote signal from one or more mobile devices using the unlicensed spectrum; and
    means for transmitting a response signal to the mobile device using a licensed spectrum, the response signal being based on the remote signal.

16. The apparatus of claim 15 wherein the response signal carries control information that is based on a received power of the remote signal and a received power of the request signal.

17. The apparatus of claim 15 further comprising means for transmitting a subsequent signal from the mobile device to another mobile device using the unlicensed spectrum at a time derived from control information of the response signal.

18. The apparatus of claim 17 wherein the subsequent signal is selected from a group consisting of a control signal, a request to send (RTS) signal, and a data signal.

19. The apparatus of claim 15 further comprising means for transmitting a subsequent signal from the mobile device to another mobile device at a code rate derived from control information of the response signal.

20. The apparatus of claim 19 wherein the subsequent signal is selected from a group consisting of a control signal, a request to send (RTS) signal, and a data signal.

21. The apparatus of claim 15 wherein the request signal is selected from a group consisting of a control signal, a request to send (RTS) signal, and a data signal.

22. A non-transitory storage medium storing instructions which when executed by a processor perform the following:
    receiving, at a first mobile device, a request signal from a second mobile device via the unlicensed spectrum;
    receiving, at the first mobile device, a remote signal from one or more mobile devices using the unlicensed spectrum; and
    transmitting a response signal from the first mobile device to the second mobile device using a licensed spectrum, the response signal being based on the remote signal.

23. The storage medium of claim 22 wherein the response signal carries control information that is based on a received power of the remote signal and a received power of the request signal.

24. The storage medium of claim 22 further comprising instructions for transmitting a subsequent signal from the second mobile device to the first mobile device using the unlicensed spectrum at a time derived from control information of the response signal.

25. The storage medium of claim 24 wherein the subsequent signal is selected from a group consisting of a control signal, a request to send (RTS) signal, and a data signal.

26. The storage medium of claim 22 further comprising instructions for transmitting a subsequent signal from the second mobile device to the first mobile device at a code rate derived from control information of the response signal.

27. The storage medium of claim 26 wherein the subsequent signal is selected from a group consisting of a control signal, a request to send (RTS) signal, and a data signal.

28. The storage medium of claim 22 wherein the request signal is selected from a group consisting of a control signal, a request to send (RTS) signal, and a data signal.

* * * * *